June 28, 1938.  H. G. KELLOGG  2,122,321
WINDSHIELD CONSTRUCTION
Filed March 26, 1934    2 Sheets-Sheet 1
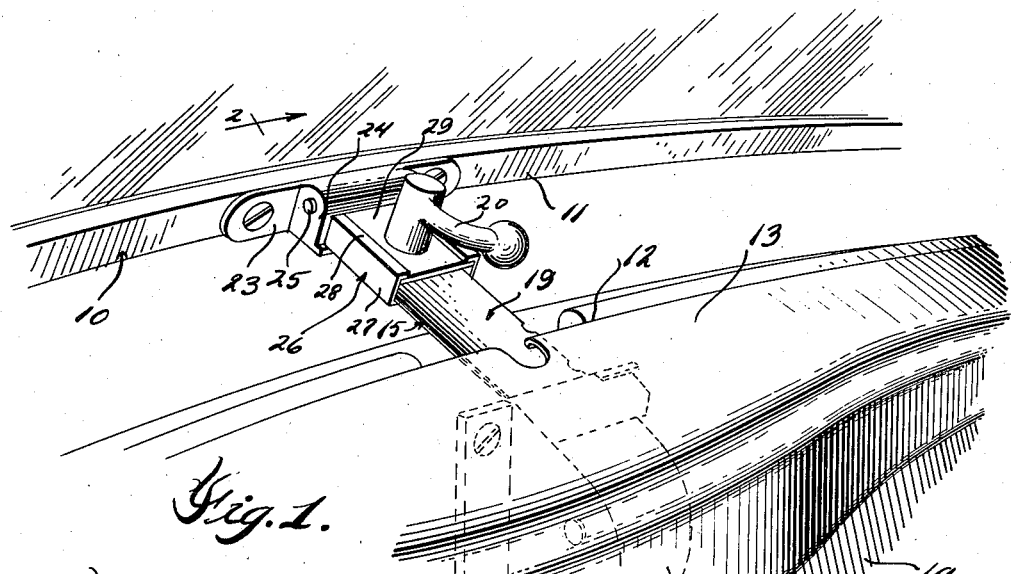
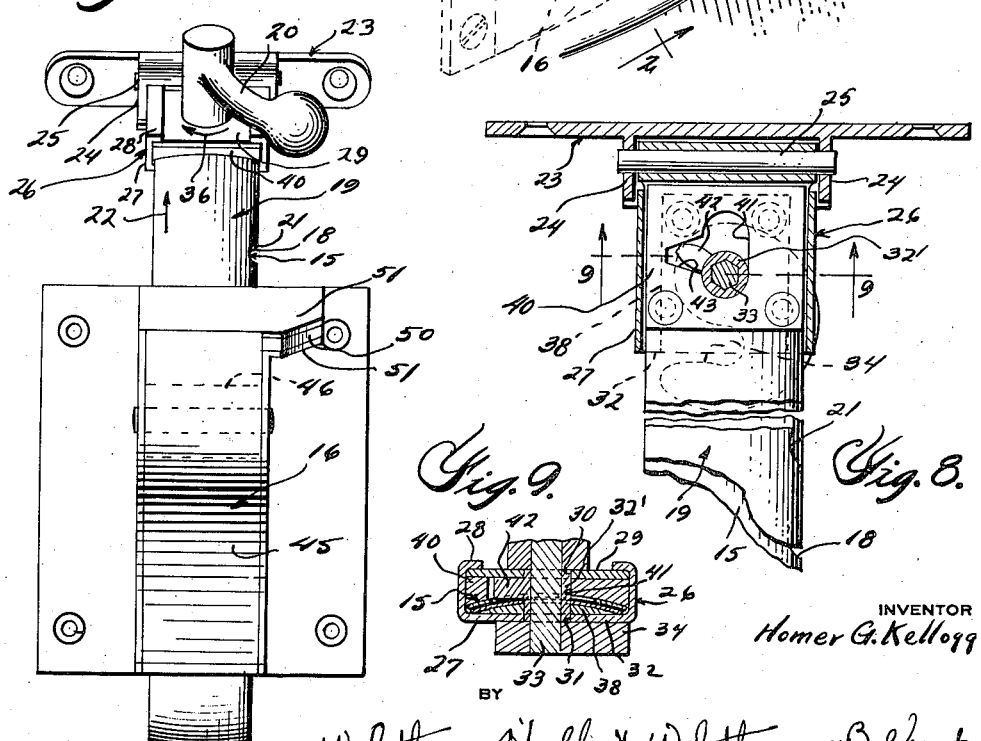
INVENTOR
Homer G. Kellogg
BY
Whittemore, Hulbert, Whittemore & Belknap
ATTORNEYS June 28, 1938.    H. G. KELLOGG    2,122,321
WINDSHIELD CONSTRUCTION
Filed March 26, 1934    2 Sheets-Sheet 2
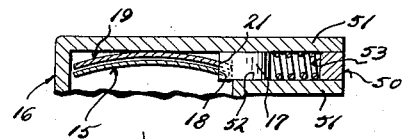
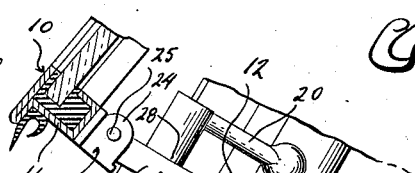
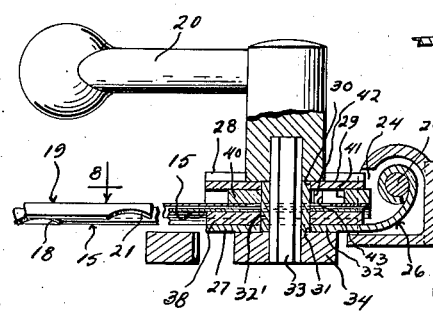
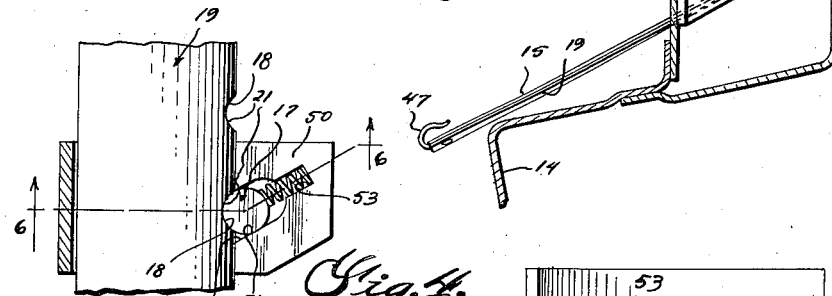
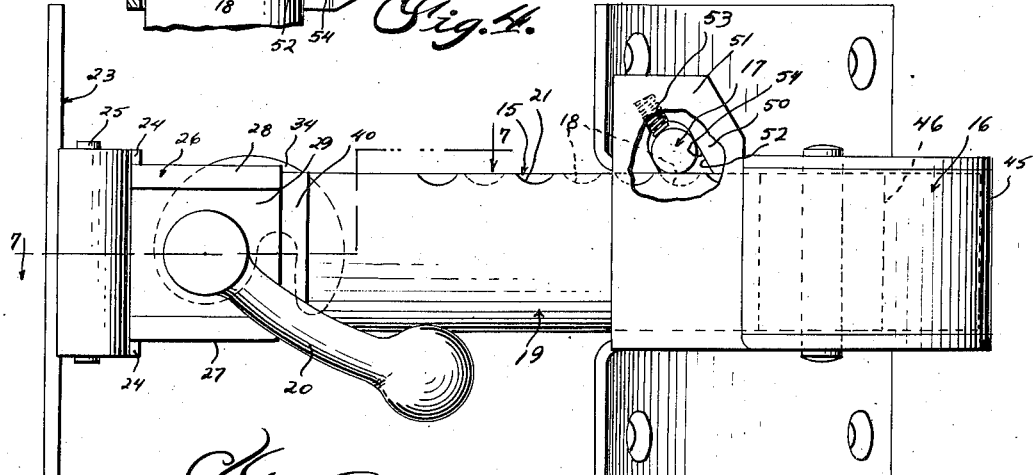
INVENTOR
Homer G. Kellogg
BY
ATTORNEYS Patented June 28, 1938

2,122,321

UNITED STATES PATENT OFFICE 2,122,321

WINDSHIELD CONSTRUCTION

Homer G. Kellogg, Detroit, Mich., assignor to Motor Products Corporation, Detroit, Mich., a corporation of New York Application March 26, 1934, Serial No. 717,500

12 Claims. (Cl. 296—84)

This invention relates generally to windshields and refers more particularly to an improved means for holding the windshield in any desired open position.

One of the principal objects of this invention is to improve generally windshield assemblies by simplifying the construction of the several parts involved and by reducing the number of such parts to a minimum. This invention contemplates simplifying windshield assemblies by providing means for holding the windshield in any desired open position rendering it possible to eliminate the usual expensive and cumbersome side braces and associated wing nuts, or equivalent devices employed in the past, to hold a windshield in its open position.

Another advantageous feature of this invention resides in connecting the swinging edge of the windshield to a relatively fixed part of the body, such as the instrument panel by means of a flexible strip having the column stiffness required to hold the windshield in any one of its open positions and also possessing sufficient flexibility to permit changing the direction of travel of the strip upon opening or closing the windshield. In accordance with this invention, the forward end of the flexible strip is secured to the swinging edge of the windshield and the opposite end portion of the strip slidably engages a guide concealed behind the instrument panel and shaped to direct the strip downwardly and forwardly upon closing the windshield.

A further object of this invention resides in the provision of means automatically operable in dependence upon movement of the windshield to any desired open position to cooperate with the strip in holding the windshield in its open position. This latter construction is such as to permit movement of the windshield to any one of its desired positions by exerting pressure directly upon the swinging edge of the windshield, thereby not only simplifying the operation of the windshield, but also rendering it unnecessary to employ expensive and complicated operating mechanism for the windshield.

A still further object of this invention resides in the provision of a latch means of the character previously set forth releasable upon manipulation of a control, permitting the windshield to be readily moved to its closed position without interference by the latch means.

In addition to the foregoing, this invention further contemplates the provision of means also operable upon manipulation of the aforesaid control to latch the windshield in its closed position.

The foregoing as well as other objects will be made more apparent as this description proceeds, especially when considered in connection with the accompanying drawings, wherein:

Figure 1 is a fragmentary perspective view of a portion of a vehicle body illustrating my improved latch mechanism for the windshield;

Figure 2 is a sectional view taken on the plane indicated by the line 2—2 of Figure 1;

Figure 3 is a plan view of the latch mechanism disclosed in Figure 2, with parts broken away, but showing the position of the parts prior to closing the windshield;

Figure 4 is a fragmentary plan view partly in section of the strip and cooperating latch means;

Figure 5 is an end elevational view of the mechanism shown in Figure 2;

Figure 6 is a cross-sectional view taken on the line 6—6 of Figure 4;

Figure 7 is a longitudinal sectional view taken on the line 7—7 of Figure 3;

Figure 8 is a substantially horizontal sectional elevational view taken on the line 8—8 of Figure 7;

Figure 9 is a vertical sectional view taken substantially on the line 9—9 of Figure 8.

Referring now to the drawings, it will be noted that I have illustrated in Figure 1 a portion of a vehicle body having a windshield 10 hingedly connected along its upper edge to the front body header (not shown) for outward swinging movement and having a frame member 11 at the lower swinging edge thereof adapted to abut a shoulder 12 formed on the forwardly extending portion 13 of the instrument panel 14.

As previously stated the present invention contemplates providing improved means for holding the windshield in any one of a number of open positions and the manner in which this is accomplished will now be described. In general, the swinging edge of the windshield 10 is connected intermediate the sides thereof to the instrument panel of the vehicle by means including a strip 15 having the forward end suitably pivotally connected to the swinging edge of the windshield and having the opposite end portion extending through a slot in the shoulder 12 to a position beneath the instrument panel 14. The strip 15 is sufficiently flexible to permit directing the same downwardly and forwardly with respect to the instrument panel 14 by means of a suitable guide 16, but on the other hand possesses sufficient column stiffness, when extended, to adequately support the swinging edge of the windshield in any one of its open positions. Suitably supported adjacent one longitudinal edge of the strip 15 is a spring pressed detent 17 automatically operable in dependence upon movement of the windshield to its open position to successively engage in suitable slots 18 formed in the aforesaid edge of the strip in spaced relation longitudinally of the strip. As will be presently described, the engagement of the detent 17 within any one of the slots 18 is such as to positively lock the windshield in its open position, or in other words, prevents accidental movement of the windshield to its closed position. In accordance with this invention the detent 17 is released from engagement with the strip 15 by means of a second strip 19 similar in construction to the strip 15 and disposed above the latter for movement relative thereto. The strip 19 is moved relative to the strip 15 through the medium of an operating handle 20 and the longitudinal edge of the strip 19 adjacent the slotted edge of the strip 15 is also provided with slots 21 registrable with the slots 18 in the operative position of the detent 17 shown in Figure 4. As will be more fully hereinafter set forth, the above arrangement is such that movement of the strip 19 in the direction of the arrow 22 relative to the strip 15 disaligns the registering slots previously referred to and thereby disengages the detent 17 from the strip 15. It will of course be apparent that when the slots 21 on the strip 19 are disposed between the slots 18 and the strip 15, reengagement of the detent with any one of these slots will be prevented and as a consequence the windshield may be readily moved to its closed position.

With the above general description of the operation of the latch mechanism in mind, reference will now be made to the specific construction of this mechanism. Secured to the rear side of the swinging edge of the windshield intermediate the ends thereof is a bracket 23 having rearwardly extending ears 24 spaced from each other longitudinally of the swinging edge of the windshield and having aligned openings therethrough for receiving a pivot pin 25. Journaled upon the pivot pin 25 between the ears 24 is a hinge block 26 having a rearwardly extending portion 27 substantially channel shaped in cross-section and having terminal flanges 28 extending inwardly from the upper ends of the side flanges of the channel. Located within the channel shaped portion of the hinge block is a top plate 29 having the marginal edges welded, or otherwise suitably secured to the terminal flanges 28 and having a centrally disposed opening 30 therethrough arranged in alignment with a corresponding opening 31 formed in the base 32 of the channel shaped portion 27. Sleeved within the aforesaid openings is a bushing 32' having a polygonally shaped opening therethrough for receiving a correspondingly shaped stud 33 having the handle 20 secured to the upper end thereof above the plate 29 and having a hook 34 suitably secured to the lower end of the shaft beneath the base 32 of the channel shaped portion 27. The above arrangement is such that when the handle 20 is rocked in the direction of the arrow 36 in the closed position of the windshield the hook 34 cooperates with a pin 37 on the body to latch the frame member 11 of the windshield in abutting engagement with the shoulder 12.

Positioned within the channel 27 upon the inner side of the base 32 of this channel is a lower plate 38 having a centrally arranged opening therethrough for receiving the bushing 32' and having a convex upper surface corresponding to the normal cross-sectional contour of the lower spring strip 15. The forward end of the latter strip is riveted or otherwise suitably secured to the plate 38 and the movement of the aforesaid end of this lower strip relative to the channel is prevented by engagement of the bushing 32' within the opening in the lower plate 38. In this connection attention is called to the fact that the opening through the plate 38 for the passage of the bushing therethrough is circular to permit rocking movement of the bushing as a unit with the stud relative to the plate.

Also located within the channel between the top plate 29 and bottom plate 38 is an intermediate plate 40 having a concave lower surface forming a seat for the correspondingly shaped upper strip 19. The forward end of the strip 19 is seated upon the inner concave surface of the intermediate plate 40 and is suitably secured thereto by means of rivets or the like. The intermediate strip 40 is apertured to provide for the passage of the bushing 32' therethrough and this aperture is in the form of a slot 41 elongated in the direction of the strip 19 to provide the limited longitudinal displacement of the strip 19 relative to the strip 15 required to disengage the detent 17 from the registering slots in the adjacent edges of both strips.

Longitudinal displacement of the strip 19 relative to the strip 15 to disalign the slots 18 and 21, or in other words, to release the detent 17 is accomplished by movement of the handle 20 in the direction of the arrow 36, while movement of the strip 19 to align the aforesaid slots is accomplished by moving the handle in the opposite direction. The operative connection between the handle and strip 19 comprises a dog 42 extending laterally outwardly from the bushing 32' and engageable in a lateral extension 43 at one side of the slot 41. Thus it will be seen that rocking movement of the handle in opposite directions will effect a sliding movement of the intermediate plate 40 in opposite directions and since the strip 19 is secured to the plate 40, the latter will be moved as a unit therewith.

With the construction as thus far described and assuming that the windshield is in its closed position the operator merely swings the handle 20 in a direction opposite the one illustrated by the arrow 36 to disengage the hook 34 from the pin 37. Incidentally, movement of the handle 20 in the aforesaid direction to release the hook from the pin also shifts the top strip 19 to a position wherein the slots 21 therein register with the slots 18 in the lower strip 15. Thus it will be observed that the detent 17 will automatically and successively move into engagement with the aligned slots upon movement of the windshield to its open position. When it is desired to disalign the slots in the two strips to release the detent 17 in the manner hereinbefore described, the handle 20 is merely moved in the direction of the arrow 36. This action places the slots 21 in the upper strip between the corresponding slots 18 in the lower strip and thereby prevents reengagement of the detent with either of the strips upon return movement of the windshield.

As previously stated, the two strips travel in a path determined by a guide 16 concealed in advance of the instrument board as shown in Figure 1. In detail the guide 16 is suitably secured to the body of the vehicle beneath the forwardly extending portion 13 of the instrument panel and in advance of the depending portion 14 thereof so as to be concealed from view. The guide is in the form of a housing open at the front side to receive the strips and having a substantially curved rear wall 45 of a width approximating the width of the strips and frictionally engageable with the uppermost strip 19. The lower strip 15, of course, follows the upper strip during movement of the latter by the windshield and both of these strips are maintained in position in the housing by means of a roller 46 supported within the housing for engagement with the lower surface of the bottom strip 15. As shown particularly in Figure 2, the rear end of the upper strip 19 is provided with a spring clip 47 curved around the corresponding end of the lower strip and adapted to cooperate with the roller 46 to prevent movement of the windshield to such an extent as to disengage the strips from the guide.

Although both of the strips are sufficiently yieldable to permit the same to travel throughout the arcuate path defined by the guide, nevertheless, they possess the column stiffness required to support the windshield in its open position. The column stiffness of the strips is materially increased by transversely curving the strips in the manner clearly shown in Figure 8 of the drawings. It has been found that particularly satisfactory results may be secured from strips formed of chrome vanadium stainless steel although various other steels may be successfully used.

Referring now more in detail to the particular construction of the detent or latch mechanism, particular attention is directed to Figures 3 to 6 inclusive. As shown in Figure 5, a latch plate 50 is welded or otherwise suitably secured to the guide 45 between the laterally extended portions 51 of the opposite side walls of the guide. The latch plate is positioned adjacent the edges of the strips which are slotted for engagement with the detent 17 and this plate is formed with a slot 52 in the edge thereof adjacent the slotted edges of the strips. The slot 52 is inclined from the aforesaid edge of the latch plate forwardly or, in the direction of movement of the strips when the windshield is being opened and this slot is of sufficient dimension to receive the locking disk or detent 17. The detent 17 is retained in the slot 52 by the portions 51 of the guide and is normally urged toward the slotted edges of the strips by means of a spring located between the portions 51 of the guide within an extension 53 of the slot 52.

Due to the inclination of the slot 52 previously pointed out the rear side wall 54 of the slot 52 forms an abutment preventing disengagement of the locking disk or detent from the strips by any tendency to move the windshield to its closed position. In other words, the construction is such as to lock the windshield in its open position and positively prevent accidental closing of the same. However, the windshield may be readily closed with the minimum amount of applied effort by merely effecting a movement of the top strip 19 forwardly relative to the bottom strip 15 through the medium of the handle 20. Inasmuch as the slot 52 is forwardly inclined, it necessarily follows that forward movement of the top strip 19 relative to the bottom strip disaligns the slots in the strips and causes the detent or disk 17 to move into the slot 52 against the action of the spring 53. Of course, when the slots are disaligned the strips cooperate with each other to prevent reengagement of the disk with the slots in the edges thereof and the windshield may be readily moved to its closed position without interference by the latch mechanism. It should be understood that the latch arrangement previously described does not interfere with movement of the windshield to its open position, notwithstanding the fact that the slots in the strip are in alignment, because the inclination of the locking disk retaining slot 52 in the locking plate is such as to permit the disk to be readily cammed into this slot 52 when the strips are moved forwardly.

Thus from the foregoing it will be seen that I have provided a relatively simple and inexpensive windshield assembly rendering it possible to eliminate the usual expensive operating mechanism. It will further be apparent that my improved windshield assembly contemplates means automatically operable in dependence upon movement of the windshield to any one of a number of open positions to positively lock the windshield against accidental closing of the same.

What I claim as my invention is:

1. A vehicle body having in combination, a windshield hingedly connected at one edge to the body for outward swinging movement, means for holding the windshield in an open position including a substantially ribbon-like strip having one end permanently connected to the swinging edge of the windshield for movement thereby and having the opposite end portion slidably engaging an arcuate surface fixed relative to the windshield, said strip possessing the flexibility required to permit the same to follow the contour of the arcuate surface and having sufficient column stiffness to effectively support the windshield in its open position.

2. A vehicle body having in combination, a windshield hingedly connected at one edge to the body for outward swinging movement, means for holding the windshield in an open position including a substantially ribbon-like strip having one end operatively connected to the swinging edge of the windshield and having the opposite end portion engaging a part fixed relative to the windshield, said strip possessing the flexibility required to permit the same to be directed in an arcuate path and having sufficient column stiffness to effectively support the swinging edge of the windshield, means operable in dependence upon movement of the windshield to an open position to cooperate with the strip in locking the windshield against return movement, and means operable upon manipulation of a control for releasing said last named means.

3. A vehicle body having in combination, a windshield hingedly connected at one edge to the body for outward swinging movement, means for holding the windshield in an open position including strips disposed back-to-back and having the forward ends operatively connected to the swinging edge of the windshield in such a manner as to permit relative sliding movement of the strips in the direction of the length thereof, means carried by a part fixed relative to the windshield for engaging the strips permitting longitudinal movement of both strips with the windshield and also permitting relative longitudinal movement of the strips, and means cooperating with one of said strips in one open position of the windshield to positively lock the windshield against return movement including a latch releasable by relatively sliding said strips.

4. A vehicle body having in combination, a windshield hingedly connected at one edge to the body for outward swinging movement, means for holding the windshield in an open position including flexible strips disposed back-to-back and having the forward ends operatively connected to the swinging edge of the windshield in a manner to permit relative sliding movement of the strips in the direction of their length, means carried by a part fixed relative to the windshield for engaging the strips permitting movement of both strips with the windshield and also permitting relative sliding movement of the strips, and latch means affording relatively free movement of the windshield to an open position and cooperating with the strip aforesaid in said open position of the windshield to automatically lock the windshield against return movement.

5. A vehicle body having in combination, a windshield hingedly connected at one edge to the body for outward swinging movement, means for holding the windshield in an open position including a flexible strip having one end operatively connected to the swinging edge of the windshield for movement therewith as a unit, means carried by a part fixed relative to the windshield slidably engaging the opposite end portion of the strip permitting the latter to be operated by the windshield upon movement of the windshield to open position, and latch means permitting relatively free movement of the windshield to an open position and cooperating with the strip in said open position to automatically lock the windshield against return movement.

6. A vehicle body having in combination, a windshield hingedly connected at one edge to the body for outward swinging movement, means for holding the windshield in an open position including a strip having one end operatively connected to the swinging edge of the windshield for movement therewith as a unit and having longitudinally spaced notches in one side edge thereof, means carried by a part fixed relative to the windshield for engaging the opposite end portion of the strip permitting the aforesaid movement of the strip, latch means automatically and successively engageable in said notches upon movement of the windshield to open position and cooperating with any one of said notches to lock the windshield against return movement, and means to release the latch means from engagement with the notch in registration therewith to permit return movement of the windshield.

7. A vehicle body having in combination, a windshield hingedly connected at one edge to the body for outward swinging movement, means for holding the windshield in an open position including strips disposed back-to-back and having the forward ends operatively connected to the swinging edge of the windshield permitting relative sliding movement of the strips, means carried by a part fixed relative to the windshield for engaging the strips permitting movement of the strips with the windshield and also permitting relative movement of the strips, both of said strips having a registrable notch in one edge thereof, latch means automatically engageable in said registering notches upon movement of the windshield to an open position and cooperating with said notches to prevent return movement of the windshield, and means for relatively sliding said strips to disalign said notches and thereby cam said latch means out of the latter.

8. A vehicle body having in combination, a windshield hingedly connected at one edge to the body for outward swinging movement, means for holding the windshield in an open position including strips disposed back-to-back and having the forward ends operatively connected to the swinging edge of the windshield permitting relative sliding movement of the strips, means carried by a part fixed relative to the windshield for engaging the strips permitting movement of the strips with the windshield and also permitting relative movement of the strips, both of said strips having registrable longitudinally spaced notches in adjacent side edges thereof, latch means automatically and successively engageable in said registering notches upon movement of the windshield to an open position and cooperating with the notches to prevent return movement of the windshield, and means for relatively sliding said strips to disalign the notches in one strip from the notches in the other and thereby cam the latch means out of the notches adjacent thereto.

9. A vehicle body having in combination, a windshield hingedly connected at one edge to the body for outward swinging movement, means for holding the windshield in an open position including substantially ribbon-like steel strips arranged back-to-back and having the forward ends operatively connected to the swinging edge of the windshield for movement with the latter, means carried by a part of the body fixed relative to the windshield and having an arcuate portion for slidably engaging said strips, both of said strips possessing the flexibility required to permit the same to travel along the path defined by the arcuate portion and also having sufficient column stiffness to effectively support the windshield in an open position.

10. A vehicle body having in combination, a windshield hingedly connected at one edge to the body for outward swinging movement, means for holding the windshield in an open position including substantially ribbon-like steel strips arranged back-to-back and having the forward ends operatively connected to the swinging edge of the windshield for movement with the latter and also for limited longitudinal movement relative to each other, means carried by a part of the body fixed relative to the windshield and having an arcuate portion for engaging said strips, both of said strips possessing the flexibility required to permit the same to travel along the path defined by the arcuate portion and also having sufficient column stiffness to effectively support the windshield in an open position, latch means operable in dependence upon movement of the windshield to open position to successively engage in registering notches formed in adjacent edges of the strips opposite the latch means and cooperating with any pair of registering notches to lock the windshield against return movement, and means for relatively sliding said strips to disalign the notches in one strip from the notches in the other and thereby cam the latch means out of the notches in the strips adjacent said means.

11. A vehicle body having in combination, a windshield hingedly connected at one edge to the body for outward swinging movement, a strip sufficiently flexible to permit the same to be moved throughout an arcuate path of travel and having sufficient column stiffness to hold the windshield in an open position, means connecting one end of the strip to the swinging edge of the windshield, means supporting the strip on a part fixed relative to the body, means automatically operable in dependence upon movement of the windshield to an open position to engage the strip and hold the windshield in said position, and common control means for latching the windshield in its closed position and for releasing the last named means.

12. A vehicle body having, in combination, a windshield hingedly connected at one edge to the body for outward swinging movement, and means for holding the windshield in an open position including a substantially ribbon-like strip having one end permanently connected to the swinging edge of the windshield for movement thereby and having the opposite end portion slidably engaging an arcuate surface fixed relative to the windshield, said strip possessing the flexibility required to permit the same to follow the contour of the arcuate surface and having sufficient column stiffness to effectively support the windshield in its open position.

HOMER G. KELLOGG.